United States Patent [19]

Akahide et al.

[11] 4,041,270

[45] Aug. 9, 1977

[54] METHODS OF WELDING CORNER JOINTS

[75] Inventors: Kozo Akahide; Kazuo Agusa, both of Chiba, Japan

[73] Assignee: Kawasaki Steel Corporation, Kobe, Japan

[21] Appl. No.: 583,102

[22] Filed: June 2, 1975

[30] Foreign Application Priority Data

June 14, 1974 Japan .................................. 49-67086

[51] Int. Cl.² ............................................ B23K 25/00
[52] U.S. Cl. .............................. 219/73 R; 219/137 R
[58] Field of Search ........................ 219/73 R, 76, 137

[56] References Cited
U.S. PATENT DOCUMENTS

| 3,192,079 | 6/1965 | Takagi et al. | 219/73 R X |
| 3,704,358 | 11/1972 | Saito et al. | 219/73 R |
| 3,748,429 | 7/1973 | Agusa et al. | 219/137 R X |

Primary Examiner—E. A. Goldberg
Assistant Examiner—N. D. Herkamp

[57] ABSTRACT

A method of welding corner joints by means of a multiple electrode submerged-arc welding and adapted to be utilized for the manufacture of a hollow square steel pillar and the like structural frameworks is disclosed. The method of welding is effected under the following three conditions:

1. The distance between first and second electrodes is 30 to 80 mm,
2. The current flowing through the second electrode is 60 to 85% of the current flowing through the first electrode, and
3. The welding heat input H is given by $$H \leqq 24 d \cdot t \text{ KJoule/cm}$$

where $t$ is a thickness of a steel flange plate in cm and $d$ is a required penetration depth in cm, whereby a weld bead is completed by a single pass of welding.

3 Claims, 5 Drawing Figures

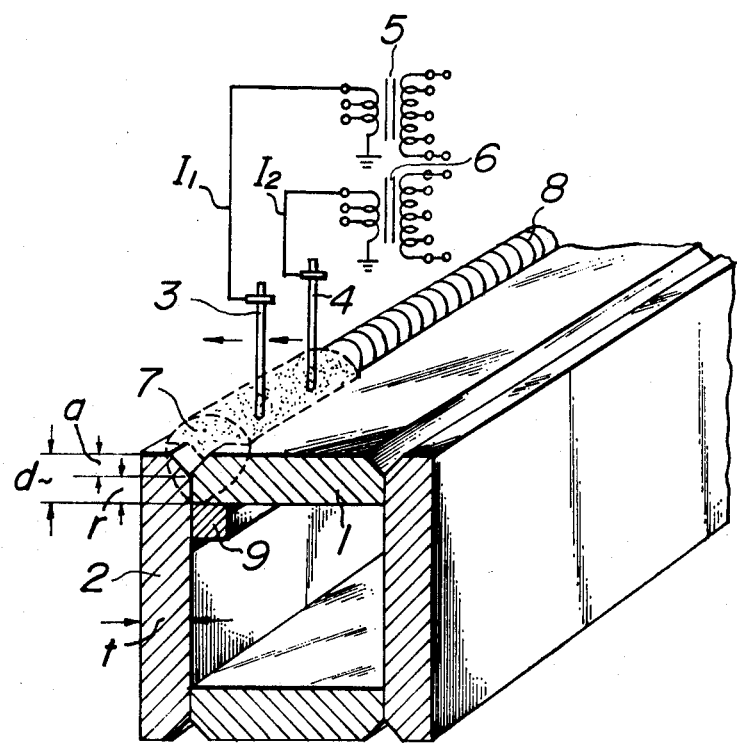
FIG_1

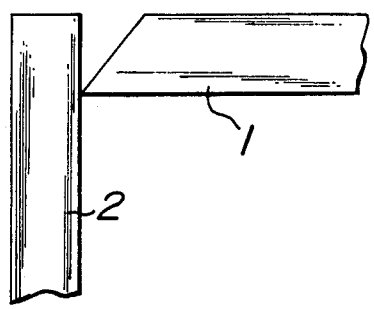
FIG_2
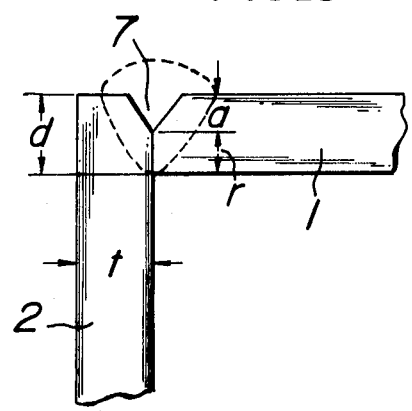
FIG_3
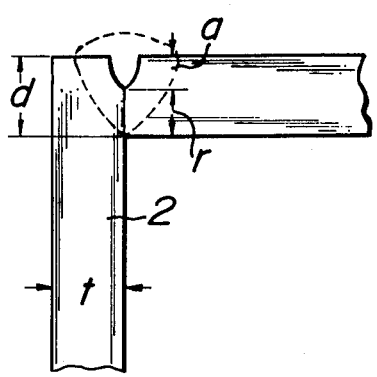
FIG_4
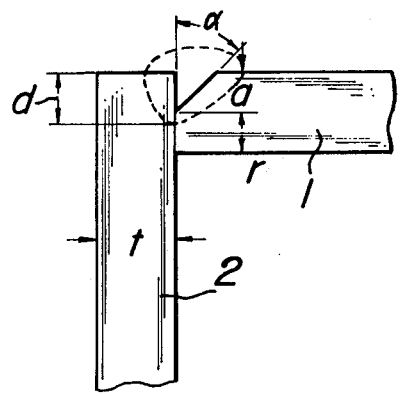
FIG_5

METHODS OF WELDING CORNER JOINTS

This invention relates to a method of welding corner joints by means of a multiple electrode submerged-arc welding in a highly efficient manner and adapted to be utilized for the manufacture of a hollow square steel pillar and the like structural frameworks. In recent years structural frameworks for use in super-high buildings and long bridges are becoming ever bigger. As a result, a building pillar, bridge beam and the like are correspondingly becoming ever bigger in size and larger in thickness. In addition, a conventional H-steel pillar is being replaced by a hollow box-type steel pillar whose mechanical strength is uniform in various directions thereof.

The hollow box-type steel pillar, that is, a hollow square steel pillar can be constructed and set in place with a minimum of time and labor, but has disadvantages that the hollow box-type steel pillar is troublesome in manufacture and increases the cost if compared with the H-steel pillar.

In the case of manufacturing the hollow square steel pillar, heretofore, it has been the common practice to oppose two channel-shaped rolled steel plates with each other to form an elongate box-shaped pillar to effect a butt welding along the opposed flanges, or to assemble four steel plates into a square form and then effect a corner welding along four corner joints.

The former method makes use of the butt joints so that the welding can be effected in a relatively easy manner, but has disadvantages that provision must be made of channel-shaped rolled steel plates and hence the cost becomes excessively high, and that the dimensional precision is degraded.

The latter method has generally been adopted in practice and makes use of four steel plates for the purpose of providing a hollow square steel pillar and has advantages that starting steel plates each having a required size can easily be obtained and that the hollow square steel pillars can simply be manufactured. This latter method, however, has disadvantages that the use of the corner welding along the four corner joints is liable to produce internal defects such as slag inclusion and the like, that use must be made of a multiple-pass welding for the steel plate having a large thickness, which requires a high degree of technique, and that the welding efficiency is worse and hence the cost becomes excessively high.

A hollow square steel pillar whose thickness is 2.5 cm, for example, is manufactured by a corner welding of four bead passes and the larger the thickness becomes the more the number of bead passes is increased, and as a result, the welding time becomes long. In addition, it is difficult to remove the slag inclusion occurred inside the groove. The time required for removing the slag inclusion sometimes amounts to several times longer than the welding time.

It might be considered to significantly improve the welding efficiency by means of a single-pass welding effected along each of the four corner joints of the hollow square steel pillar having a large thickness. Such single-pass corner welding technique, however, has never been succeeded owing to the following reasons.

Heretofore it has been the common practice to use a groove formed between a web plate 1 and a flange plate 2 and having a large sectional area and a small root face for the purpose of providing a completely penetrated root as shown in FIG. 1. As a result, the amount of weld deposited in the joint becomes insufficient in the case of effecting the single-pass welding along each of the four corner joints of the square steel pillar whose thickness is at least 2.0 cm, even if the welding speed is made as slow as possible. Thus, in practice, it is obliged to rely upon the multiple-pass welding.

In the slow speed welding, if the welding input heat is considerably increased, the temperature of the flange plate 2 becomes remarkably raised and both the molten slag and the molten metal flow down from the side surface of the flange plate 2, thereby rendering the welding impossible.

The invention is based on the above recognition and provides a method of manufacturing a hollow square steel pillar having a large thickness of at least 2.0 cm in a highly efficient manner. For this purpose, a number of repeated experimental tests on the single pass welding along the corner joint have yielded the result that in the case of multiple-electrode submerged-arc welding, if a distance between the first and second electrodes and a ratio of the currents flowing through these two electrodes are suitably chosen and if the welding input heat is defined from the thickness of the flange plate and from the required penetration depth, provision may be made of a novel method of welding corner joints, which can make use of a shallow groove having a small sectional area and which can obtain a deep penetration.

The flange plate and the web plate may be prepared by cutting a plate having a desired thickness into an elongate strip having a necessary width. The web plate is horizontally arranged and the flange plate is disposed such that its widthwise direction is made perpendicular to the horizontal web plate and that its thickness direction is horizontally arranged. The top end surface of the vertical flange plate is flushed with the top main surface of the horizontal web plate and a shallow groove having a small area with a required shape is formed between the flange and web plates.

An object of the invention, therefore, is to provide a method of welding corner joints by means of a multiple electrode submerged-arc welding in a highly effective manner and adapted to be utilized for the manufacture of a hollow square steel pillar and the like structural frameworks.

Another object of the invention is to provide a method of welding corner joints, which can complete by a single pass of welding a weld bead which is sound, does not include any internal defects such as slag inclusion and the like and is good in appearance.

A further object of the invention is to provide a method of welding corner joints, which can be effected within a short time without being accompanied by a troublesome operation of removing the slag inclusion.

A feature of the invention is the provision of a method of welding corner joints by means of a multiple electrode submerged-arc welding, comprising forming a shallow groove between a steel flange plate and a steel web plate, each having a thickness on the order of at most 5.0 cm, covering said groove with a bed of flux, and feeding at least two electrodes separated from each other along said groove in succession and submerged under said flux, said welding being effected under the following three conditions:

1. The distance between the first and second electrodes is 30 to 80 mm,

2. The current flowing through the second electrode is 60 to 85% of the current flowing through the first electrode, and 3. The welding input heat H is given by $$H \leqq 24\, d.t \text{ KJoule/cm}$$

where $t$ is a thickness of said steel flange plate in cm and $d$ is a required penetration depth in cm, whereby a weld bead is completed by a single pass of welding.

The invention will now be described in greater detail with reference to the accompanying drawings, wherein:

FIG. 1 is a perspective view illustrating a method of welding corner joints according to the invention;

FIG. 2 is a diagrammatic illustration of a deep groove formed between the flange and web plates in accordance with the prior art welding method; and FIGS. 3 to 5 are diagrammatic illustrations of various types of shallow grooves formed between the flange and web plates in accordance with the invention.

Referring to FIG. 1, reference numeral 1 designates a web plate and 2 a flange plate, the both web and flange plates having a thickness on the order of at most 5.0 cm and adapted to be used for manufacturing a hollow square steel pillar for super high buildings.

In the embodiment shown in FIG. 1, use is made of two electrodes 3 and 4 separated from each other by 30 to 80 mm. Let the current be supplied from a transformer 5 to the first electrode 3 be $I_1$ and let the current be supplied from a transformer 6 to the second electrode 4 be $I_2$, $I_2$ is chosen to 60 to 85% of $I_1$. In addition, use is made of a Y-type groove as shown in FIG. 3. Let the thickness of the flange plate be t cm, and let the required penetration depth be d cm, a welding input heat H is chosen such that it is given by $$H \leqq 24\, d.t \text{ KJoule/cm}$$

The use of the welding conditions as defined above ensures a single pass bead welding along a corner joint formed between the flange and web plates 1, 2 each having a large thickness and provides the important advantage that an economical and efficient way of accomplishing the single pass bead welding, and that the welding can be applied effectively to the manufacture of hollow square steel pillars whose thickness is on the order of at most 5.0 cm.

In FIG. 4 is shown a U-type groove whose depth is also a.

In FIG. 5 is shown a modified Y-type groove whose depth is also a, one of two legs of which being formed by the vertical side surface of the flange plate 1 and the other leg being inclined therefrom by $a$.

Two electrodes submerged-arc welding tests were effected under various welding conditions shown in the following Table 1, in which the two electrodes 3 and 4 were melted off under a bed of granulated flux 7 to form a one pass bead 8 as shown in FIG. 1, the thickness of the web plate 1 was made 25 mm and the thickness $t$ of the flange plate 2 was changed. The test results obtained are shown in the following Table 2.

Table 1

| | Welding Conditions | | | | | | | | | | |
|---|---|---|---|---|---|---|---|---|---|---|---|
| | Groove | | Thickness of flange t (cm) | Required penetration d (cm) | First electrode | | Second electrode | | Speed V (cm/min) | Distance between electrodes (mm) | $I_2/I_1$ | H/dt (KJoule/cm) |
| Test No. | Angle α (deg) | Height of root r (cm) | | | Current $I_1$ (A) | Voltage $E_1$ (V) | Current $I_2$ (A) | Voltage $E_2$ (V) | | | | |
| 1 | 45 | 1.0 | 2.5 | 2.5 | 1,600 | 35 | 900 | 45 | 70 | 50 | 0.56 | 13 |
| ② | " | " | " | " | " | " | 1,000 | " | " | " | 0.63 | 14 |
| ③ | " | " | " | " | " | " | 1,250 | " | " | " | 0.78 | 15 |
| ④ | " | " | " | " | " | " | 1,340 | " | " | " | 0.85 | 16 |
| 5 | " | " | " | " | " | " | 1,400 | " | " | " | 0.88 | 16 |
| 6 | " | " | " | " | " | " | 1,250 | " | " | 25 | 0.78 | 15 |
| ⑦ | " | " | " | " | " | " | " | " | " | 30 | " | " |
| ⑧ | " | " | " | " | " | " | " | " | " | 75 | " | " |
| 9 | " | " | " | " | " | " | " | " | " | 90 | " | " |
| 10 | " | " | " | " | " | " | " | " | " | 150 | " | " |
| 11 | " | " | 1.5 | " | " | " | " | " | " | 60 | " | 26 |
| ⑫ | " | " | 2.0 | " | " | " | " | " | " | " | " | 19 |
| 13 | " | 0.3 | 2.5 | " | 1,100 | 32 | 900 | 40 | 25 | 50 | 0.82 | 27 |
| ⑭ | " | 0.6 | " | " | 1,300 | 34 | 1,000 | 40 | 50 | " | 0.77 | 16 |
| 15 | " | 1.0 | " | " | " | " | " | " | 55 | " | " | 15 |
| 16 | " | " | 1.2 | " | 1,600 | 35 | 1,250 | 45 | 70 | 60 | 0.78 | 32 |

Note:
1) Electrode wires are made of iron containing a small amount of carbon and manganese(C: 0.06 wt. %, Si: 0.02 wt. %, Mn: 0.48 wt. % and the remainder of Fe) and availablein market in a trade name of KW-43.Flux is of one which is available in market in a trade name of KB-14.
2) Diameter of the electrode wires: The first electrode: 4.8 mm,The second electrode: 6.4 mm.Inclined angle of the electrode wires: the rearwarding angle of the first electrode: 5,the leading angle of the second electrode: 15.

| | | | | Test Result | | | | | |
|---|---|---|---|---|---|---|---|---|---|
| Test No. | Amount of penetration | Amount of reinforcement of weld | Appearance of bead | Undercut | Slag inclusion | Crack | Flow down of molten metal | Overall result | Remarks |
| 1 | 0 | x | x | x | x | x | o | x | Comparison Example |
| ② | o | o | o | o | o | o | o | o | Invention |
| ③ | o | o | o | o | o | o | o | o | " |
| ④ | o | o | o | o | o | o | o | o | " |
| 5 | o | o | x | x | o | o | o | x | Comparison Example |
| 6 | o | o | x | o | o | x | o | x | " |
| ⑦ | o | o | o | o | o | o | o | o | Invention |
| ⑧ | o | o | o | o | o | o | o | 0 | " |
| 9 | o | o | o | o | x | x | o | x | Comparison Example |
| 10 | o | o | o | o | x | x | o | x | " |

-continued

| Test No. | Amount of penetration | Amount of reinforcement of weld | Appearance of bead | Test Result Undercut | Slag inclusion | Crack | Flow down of molten metal | Overall result | Remarks |
|---|---|---|---|---|---|---|---|---|---|
| 11 | o | x | x | o | o | o | x | x | " |
| 12 | o | o | o | o | o | o | o | o | Invention |
| 13 | o | o | x | x | o | o | o | x | Comparison Example |
| 14 | o | o | o | o | o | o | o | o | Invention |
| 15 | x | o | o | o | o | o | o | x | Comparison Example |
| 16 | o | o | x | x | o | x | x | x | " |

Note:
Symbol o designates a satisfactory result while symbol x designates an unsatisfactory result.

The reasons why the distance between the first and second electrodes is limited to 30 to 80 mm and the ratio of $I_2/I_1$ is limited to 0.6 to 0.85 are to prevent crack produced in the weld metal at a high temperature. As seen from the test result shown in the Table 2, if the welding condition does not satisfy either one or both of these ranges, the crack is produced. If the distance between the electrodes is longer than 80 mm and the $I_2/I_1$ ratio is smaller than 0.6, the weld metal beneath the first electrode and the weld metal beneath the second electrode become solidified separately from each other, and as a result, the crack is produced in the weld metal beneath the first electrode.

On the contrary, if the distance between the electrodes is shorter than 30 mm and the ratio $I_2/I_1$ is larger than 0.85, the weld metal beneath the first electrode is combined together with the weld metal beneath the second electrode to make worse the solidified state of the weld metal, and as a result, the crack is produced at the center of the weld metal. In this case, the bead becomes narrow in its width and coarse in its surface ripple, thereby rendering its appearance bad.

The reasons why the welding input heat H is limited to smaller than 24 t.d KJoule/cm are mainly due to the fact that if the welding input head H exceeds 24 t.d KJoule/cm, it becomes impossible to effect the desired welding owing to the excessively high temperature rise of the flange plate 2.

That is, if the welding input heat H relative to the thickness t of the flange plate 2 and the penetration depth d becomes larger than 24, the cooling of both the molten steel and the molten slag are retarded, and as a result, these molten steel and slag are flown down from the side surface of the flange plate 2, whereby it becomes impossible to effect the desired welding. In addition, the corners of the hollow square steel pillar become deformed.

Even if the molten steel and slag are not flown down, the bead becomes bad in appearance and such defect as undercut and the like is produced, whereby the satisfactory result shown by the Table 2 by the symbol o could not be obtained. As a result, it is necessary to make the welding input heat as small as possible and effect a deep penetration welding.

For this purpose, the use of the prior art groove whose depth a is substantially equal to the required penetration depth d as shown in FIG. 2 is not permitted since in this case the arc penetrating action could not effectively be utilized. On the contrary, the invention makes use of the Y, U or modified Y-type groove having a small sectional area as shown in FIGS. 3 to 5 and makes the groove depth a one third to three fourths of the required penetration depth d, thereby effectively utilizing the arc penetration action.

The invention will now be described with reference to the following examples 1 to 3.

EXAMPLE 1

A hollow square steel pillar composed of four steel plates made of JIS SM-41 steel and each having a dimension of 2.8 cm (thickness) × 40.0 cm (width) was manufactured.

In the point of contact of the two steel plates to be joined was formed a Y-shaped groove.

The two steel plates were provisionally assembled with the aid of a backing strip 9 as shown in FIG. 1 and subjected to the two-electrode submerged-arc welding with a required weld penetration of 2.8 cm.

The first electrode was supplied with 1,700 A, 45 V, while the second electrode was supplied with 1,200 A, 45 V. These two electrodes were fed from respective coils and melted off under a bed of granulated flux 7 to form a corner joint bead 8. The welding speed was 70 cm/min.

Use was made of a welding electrode wire made of steel containing a small amount of carbon and manganese (C: 0.06 wt.%, Si: 0.02 wt.%, Mn: 0.48 wt.% and the remainder of Fe) and available in market in a trade name of KW-43. Use was also made of an agglomerated basic welding flux made of system $MgO \cdot CaO-SiO_2$ (MgO: 24 wt.%, CaO: 21 wt.%, $SiO_2$: 36 wt.%, $Al_2O_3$: 8 wt.%, $CaF_2$: 4 wt.%, and the remainder: 7 wt.%).

The distance between the first and second electrode wires was made 40 mm. Under the above welding conditions, $I_2/I_1$ was equal to 0.70 and the input heat $H$ was equal to 112 KJoules/cm, that is, 14 d.t KJoule/cm.

Experimental tests have yielded the result that the weld penetration is of sufficient one, that there is no risk of interior defects such as crack, slag inclusion, blowhole and the like being produced in the weld, and that an appropriate reinforcement of weld with a good appearance is obtained.

Charpy impact tests subjected to test pieces obtained from the weld and each having a V-shaped 2 mm notch showed 7.2 Kg.m on average at 0° C.

Tensile tests subjected to round bar-shaped test pieces obtained from the weld showed an averaged tensile strength of 47 Kg/mm² and an elongation of 35%.

As seen from the above test results, the weld obtained by the welding method according to the invention was excellent in mechanical strength, ductility and toughness.

The welding method according to the invention could make the welding time one-fourth times shorter than that required for the prior art welding method and could make the welding material one-third times smaller than that required for the prior art welding method.

EXAMPLE 2

Three-electrode submerged-arc welding was applied to four steel plates each having a dimension of 3.5 cm (thickness) × 60.0 cm (width) and made of JIS SM-50 steel (C: 0.15 wt.%, Si: 0.42 wt.%, Mn: 1.36 wt.%, P: 0.018 wt.%, S: 0.012 wt.% and the remainder of Fe) for the purpose of manufacturing an elongate hollow square steel pillar.

In the point of contact of the two plates to be joined was formed a modified V-shaped groove shown in FIG. 5 and having a groove angle α of 40° and a groove depth a of 2.5 cm.

Use was made of a welding electrode wire made of steel available in market in a trade name of KW-43 (C: 0.06 wt.%, Si: 0.02 wt.%, Mn: 0.48 wt.% and the remainder of Fe). Use was also made of an agglomerated basic welding flux for use in a 50 Kg/mm² grade high tension steel (MgO: 26 wt.%, CaO: 16 wt.%, $CaF_2$: 13 wt.%, $SiO_2$: 18 wt.%, $Al_2O_3$: 15 wt.%, $Na_2O$: 5 wt.% and the remainder: 7 wt.%).

The distance between the first and second electrode wires was made 70 mm, while the distance between the second and third electrode wires was made 80 mm. The first electrode wire was supplied with 1,800 A, 35 V, the second electrode wire was supplied with 1,400 A, 45 V and the third electrode was supplied with 1,300 A, 35 V. These three electrodes were fed from respective coils and melted off under a bed of granulated flux to form a corner joint having a penetration depth of 3.5 cm. The welding speed used was 60 cm/min.

Experimental tests have yielded the result that there is no risk of both interior and exterior defects being produced in the weld, that the weld penetration is of sufficient one, and that one pass weld bead which is good in appearance is obtained.

Charpy impact tests subjected to test pieces obtained from the weld and each having a V-shaped 2 mm notch showed 5.8 Kg.m on average at 0° C.

Tensile tests subjected to round bar shaped test pieces obtained from the weld showed an averaged tensile strength of 58 Kg/mm².

EXAMPLE 3

Two-electrode submerged-arc welding was applied to four steel plates each made of JIS SS-41 steel (C: 0.21 wt.%, Si: 0.14 wt.%, Mn: 1.04 wt.%, P: 0.014 wt.%, S: 0.010 wt.% and the remainder of Fe) and having a dimension of 5.0 cm (thickness) × 110.0 cm (width) for a flange plate and a dimension of 4.0 cm (thickness) × 110.0 cm (width) for a web plate and manufactured an elongate hollow square steel pillar.

In the present example, use was made of a partial penetration of 20 mm which is equal to one half the web thickness. The groove depth a was 12 mm, the root gap was 0 mm, and the groove was of a modified V-type as shown in FIG. 5 and having a groove angle α of 45°.

In the two-electrode submerged-arc welding, the first electrode was supplied with 1,400 A, 30 V, and the second electrode was supplied with 1,100 A, 45 V. These two electrodes were fed from respective coils and the distance between the first and second electrodes was made 30 mm. The welding speed was 80 cm/min.

Under the above welding conditions, $I_2/I_1$ was equal to 0.79 and the input heat H was made equal to 69 KJoules/cm, that is, 6.9 d.t KJoules/cm.

Use was made of a welding electrode wire available in market in a trade name of KW-36 (C: 0.09 wt.%, Si: 0.03 wt.%, Mn: 1.95 wt.%, P: 0.010 wt.%, S: 0.014 wt.% and the remainder of Fe).

Use was also made of a neutral fused type welding flux made of system $SiO_2$-CaO-MnO ($SiO_2$: 42 wt.%, MnO: 38 wt.%, CaO: 15 wt.% and the remainder: 5 wt.%).

Cross sections of weld bead have revealed that the required weld penetration of 21 mm to 22 mm is obtained, that there is no risk of interior defects such as crack, slag inclusion, blowhole and the like being produced in the weld, and that an appropriate reinforcement of weld having a height of 2 mm to 3 mm and a width of 20 mm to 22 mm is obtained with a good appearance.

Tensile tests subjected to round bar-shaped test pieces obtained from the weld showed an averaged tensile strength of 49 Kg/mm². In addition, charpy impact tests subjected to test pieces obtained from the weld showed 6.4 Kg.m on average at 0° C.

As seen from the above, the method according to the invention is capable of effecting a corner welding along a corner joint formed by two steel plates each having a large thickness by means of one pass only, which has heretofore been required to be effected by a number of passes, is capable of significantly improving the welding efficiency by 4 to 5 times higher than that of the prior art method, and is capable of reducing the amount of the welding materials inclusive of the welding electrode and flux by one half to one third times smaller than that of the prior art method, thereby considerably reducing the manufacturing cost.

In addition, the method according to the invention permits to provide a corner weld which is less in interior defects such as a slag inclusion and the like and hence is superior in quality.

What is claimed is:

1. A method of welding corner joints by means of a multiple electrode submerged-arc welding, comprising forming a shallow groove between a steel flange plate and a steel web plate, each having a thickness on the order of at most 5.0 cm, covering said groove with a bed of flux, and feeding at least two electrodes separated from each other along said groove in succession and submerged under said flux, said welding being effected under the following three conditions:
   1. The distance between the first and second electrodes is 30 to 80 mm,
   2. The current flowing through the second electrode is 60 to 85% of the current flowing through the first electrode, and
   3. The welding input heat H is given by $$H \leq 24 \, d.t \text{ Kjoules/cm}$$

where t is a thickness of said steel flange plate in cm and d is a required penetration depth in cm, whereby a weld bead is completed by a single pass of welding.

2. A method of welding corner joints as claimed in claim 1, wherein said shallow groove has a depth which is one third to three fourths of said required penetration depth.

3. A method of welding corner joints as claimed in claim 1, wherein said shallow groove is selected from a Y-type groove, a U-type groove and a modified Y-type groove.

* * * * *